May 31, 1960

R. E. LOWEY, JR 2,938,231

PLASTIC EXTRUSION DIE

Filed Oct. 2, 1958

INVENTOR.
Roy E. Lowey Jr.
BY Bosworth, Sessions,
Herrstrom & Knowles
ATTORNEYS.

May 31, 1960                R. E. LOWEY, JR                2,938,231
                           PLASTIC EXTRUSION DIE
Filed Oct. 2, 1958                                    2 Sheets-Sheet 2

INVENTOR.
Roy E. Lowey Jr.
BY Bosworth, Sessions,
Herretron & Knowles
ATTORNEYS.

United States Patent Office 2,938,231
Patented May 31, 1960

2,938,231
PLASTIC EXTRUSION DIE

Roy E. Lowey, Jr., Cuyahoga Falls, Ohio, assignor, by mesne assignments, to Blaw-Knox Company, Pittsburgh, Pa., a corporation of Delaware Filed Oct. 2, 1958, Ser. No. 764,899

12 Claims. (Cl. 18—12)

This invention relates to a plastic extrusion die and more particularly to an extrusion die for extruding thermo-plastic material such as polyethylene, nylon, or vinyl into film or sheet the gauge of which must be accurately controlled.

It is well known that plastic sheet material can be formed by extrusion with a conventional extruding machine and a suitable die. The sheet-forming die generally consists of two die blades which define an elongated slot or gap constituting the die orifice. The width of the slot controls the ultimate thickness of gauge of the sheet and the length of the slot determines the width of the sheet to be extruded. At least one of the blades is adjustably mounted on a common body portion which also serves to distribute plastic material supplied from the extruding machine along the length of the die gap. The gauge of the sheet being extruded, determined by the gap between the die blades, is controlled by adjustment of either or both of the blades toward or away from each other.

Adjustment of the width of the gap from end to end has, in the past, been accomplished mechanically by a number of bolts spaced apart along the length of each of the die blades. The bolts are independently adjustable and engage one of the die blades so as to push or pull a localized portion of the die blade toward or away from the adjacent portion of the other die blade. By proper adjustment of each of the number of bolts on each of the die blades, the gap between the die blades can be controlled throughout its length.

In the past, the bolts have been adjusted solely by mechanical means. For example, the bolts may be extended through bores in projecting shoulders on each side of the body portion and mounted for axial displacement by means of nuts on the bolts engaging opposite sides of the projecting shoulders. Such adjusting means allows for the reasonably accurate adjustment of the entire length of the die gap between the die blades while the die is cold and before a run of sheet material has begun. Under running conditions, however, the plastic material heats up the die causing the various parts of the die to expand and alter the previously adjusted gap resulting in a plastic sheet whose thickness varies across its width from the desired gauge.

Therefore, after the die has reached its running condition temperature, it is necessary to readjust the gap between the die blades to produce uniform sheet material of the desired constant gauge. By present methods, this is difficult to do accurately because of the relatively coarse adjustment provided by mechanical means. In addition, it is difficult to work in close proximity to the hot dies as required by the conventional adjusting mechanism and much plastic material is wasted until the proper adjustment can be made.

Therefore, it is the principal object of my invention to provide an extrusion die for extruding plastic sheet material having a fine and accurate gap control. It is also an object of my invention to provide a plastic sheet extrusion die having a gap that can be accurately and continuously controlled. It is a further object of my invention to provide an extrusion die for plastic sheet material having a gap that can be controlled remotely from the die and away from the heat and tight spacing frequently encountered. Still another object of my invention is to provide plastic sheet extrusion die having a gap control with which reproduceable results can easily be obtained. It is yet another object of my invention to provide an extrusion die for extruding plastic sheet material having a gap control provided with an indication setting.

Other objects and advantages of my invention will become apparent from the following description of a preferred embodiment of the invention, reference being made to the accompanying drawings in which.

Briefly, I accomplish the foregoing objects of my invention by providing an extrusion die having a body portion and a die gap defined by two die blades that are mounted on the body portion and are adjustable throughout their lengths toward and away from each other. The die blades are maintained in position with respect to each other by a number of bolts which are mounted in the common body portion and secured to the blades; half of the bolts act between one blade and the common body portion and the other half act between the other die blade and the common body portion. Adjustment of the gap between the die blades is accomplished by independently adjusting each bolt. For this purpose, I provide mechanical means for a coarse adjustment of the position of the bolts in the body and thermal means for accomplishing a fine adjustment of the acting length of each of the bolts. The thermal fine adjustment is made by means of electric heaters and independently controls the temperature and thus the length of each of the bolts between their mounting in the body and the points where they are joined to the blades. The length of each of the bolts can thus be controlled and adjusted by mechanical and electrical means which act independently of each other but whose effect is cumulative upon the effective length of each of the bolts.

It is thus apparent that the desired gap between the die blades can initially be set from one end of the gap to the other by the proper independent adjustment of each of the bolts through the use of the coarse mechanical means. Corrective adjustments, as well as adjustments necessitated by changes in temperature of the die in operation, can be easily and accurately made by the use of the remotely controllable electrical heating adjustment means.

Figure 1:
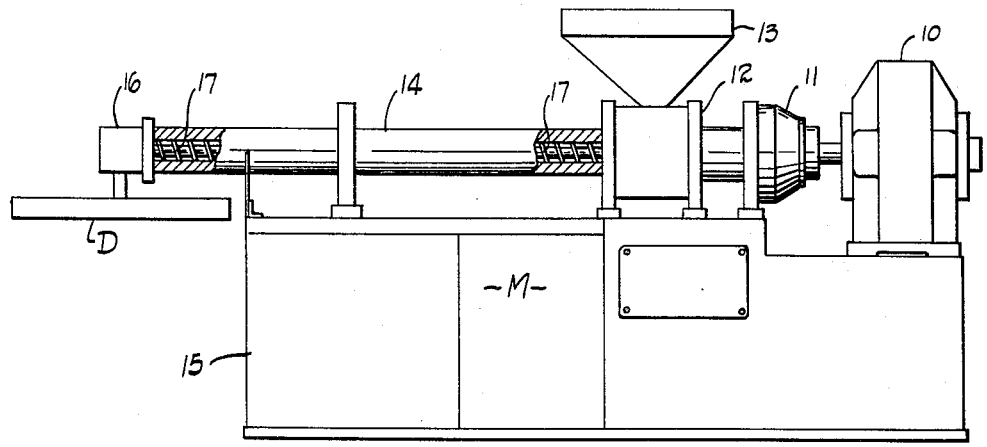
Figure 1 is a side elevation of a conventional extruding machine having an extrusion die of my invention mounted thereon.

Referring now to the drawings, Figure 1 depicts a conventional extruding machine M including a driving motor 10, a power transmission and thrust bearing 11, a feed box 12 with hopper 13 and barrel 14 all mounted in axial alignment on a base 15. The plastic extrusion die D of my invention is mounted on the head or outlet end 16 of barrel 14. In normal operation, thermo-plastic material, for example, in pellet form, together with the necessary solvents, is placed in hopper 13 for introduction into feed box 12 of the extruder. A screw 17 in barrel 14 is driven by motor 10 through power transmission and thrust bearing 11. As the plastic material progresses from the feed box 12 to the head or outlet end 16 of the barrel, the action of the screw 17, together with heat applied to the barrel, works the material into a homogenous plastic state delivering it to the head or outlet end 16 of barrel 14 under sufficient pressure to extrude the material through die D. The die is arranged to extrude a continuous sheet of plastic material whose width is equal to the longitudinal dimension of the die.

Figure 2:
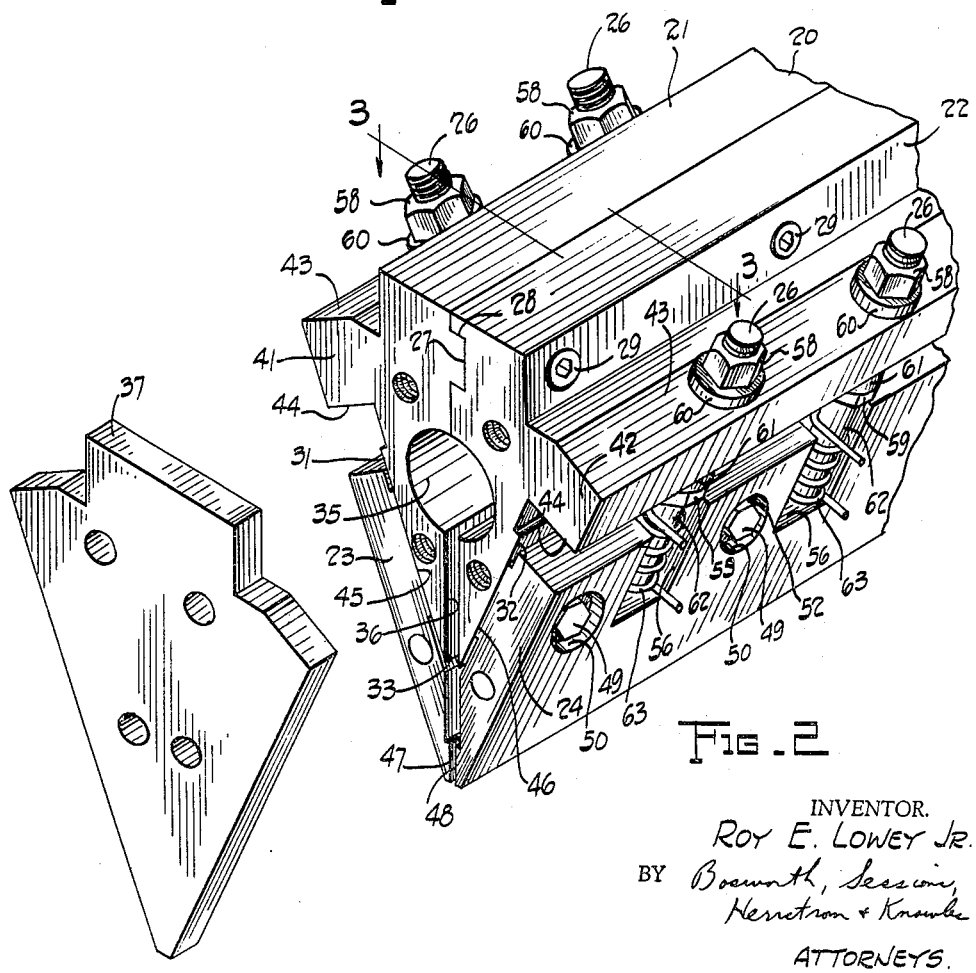
Figure 2 is a partially exploded perspective view of one end portion of the extrusion die of my invention.
Figure 3:
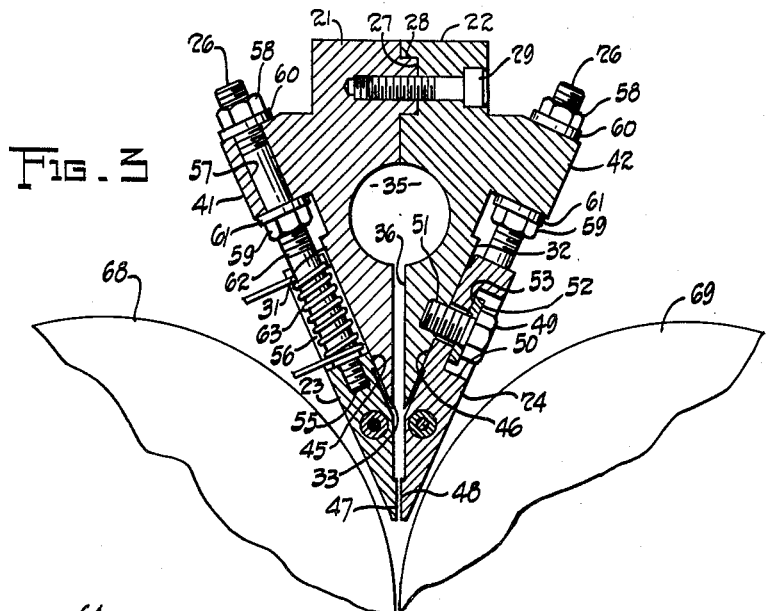
Figure 3 is a transverse cross section of the extrusion die of my invention taken in the plane of line 3—3 of Figure 2 and further showing the relationship of the extrusion die to conventional equipment of the type used in coating paper or fabric with plastic sheet material.

A preferred form of die embodying the invention is shown in Figures 2 and 3. The die comprises a body portion 20 consisting of two halves 21 and 22, a pair of die blades 23 and 24 mounted on body halves 21 and 22, respectively, by suitable means and a number of adjusting bolts 26. The mating faces of the two halves 21 and 22 of body portion 20 have a longitudinally extending square tongue 27 and groove 28, respectively, for positive alignment with respect to each other, and are held together by screws 29.

The body portion preferably has a generally V-shaped transverse cross section, as seen in Figure 3, and extends in length a distance equal to the width of the sheet to be extruded by the die. The lower portion of body member 20 has two finished exterior faces 31 and 32 which are longitudinally parallel and transversely angularly related to each other so that if projected, they would intersect a short distance below the bottom 33 of body portion 20. The body portion 20 has an interior chamber 35 extending longitudinally through it. This communicates with a slot or passage 36, formed by the spacing of the lower parts of halves 21 and 22, which is co-extensive in length with the interior chamber 35 and extends to the exterior of the body. Each end of the interior chamber 35 and slotted outlet passage 36 is closed by an end plate 37 held in place by suitable means. A transverse inlet passage extends from the exterior of body portion 20 to and in communication with interior chamber 35, preferably intersecting chamber 35 approximately at its longitudinal midpoint. Interior chamber 35 is charged with the material to be extruded from outlet end 16 of the barrel 14 of the extruding machine through this passage.

In order to support the adjusting bolts 26, the angularly related faces 31 and 32 of the body 20 have longitudinally extending transverse projections 41 and 42, respectively. These projections are formed with parallel upper and lower faces 43 and 44 lying in planes normal to their respectively associated angularly related faces 31 and 32. The two die blades 23 and 24, having finished side faces 45 and 46 and working faces 47 and 48, respectively, are mounted on body member 20 so that the finished side faces 45 and 46 of the die blades engage the angularly related exterior finished faces 31 and 32 of body member 20, respectively; working faces 47 and 48 cooperate to form a die gap aligned with and adjacent to the exterior end of outlet passage 36 in body portion 20. The die blades 23 and 24 are mounted to the body member 20 by means of a number of cap screws 49 which pass through counterbored holes 50 spaced apart along the length of the blades and into tapped holes 51 in the body member 20. The lesser diameter of holes 50 is substantially larger than the diameter of screws 49. Suitable washers 52, under the heads of cap screws 49, bear against the radially extending shoulders 53 in the bottom of the counterbores. The oversize mounting holes 50 in the die blades 23 and 24 permit the amount of movement of the blades with respect to the body portion 20 and with respect to each other that is necessary to adjust the gap between the working faces 47 and 48 of the die blades as desired.

The adjusting bolts 26 are screwed into tapped holes 55 in the bottom of square notches 56 spaced along the length of each of the die blades and extend therefrom parallel to each other and to the adjacent angularly related finished faces 31 and 32 of body member 20. The upper end of each of the bolts is threaded and extends through a suitably located bore 57 in one of the transverse projections 41 and 42 of body member 20. The square notches 56 for accommodating the bolts 26 are preferably located approximately midway between the mounting holes 50 in the die blades 23 and 24. Each of the adjusting bolts 26 is provided with adjusting nuts 58 and 59 and washers 60 and 61 which bear against the upper and lower faces 43 and 44 of the transverse projections to provide for coarse adjustment of the bolts. It will be apparent that by such adjustment of bolts 26, the die blades can be disposed up and down the angularly related side faces of body portion 20, widening or narrowing the gap between working faces 48 and 49 as desired.

Figure 4:
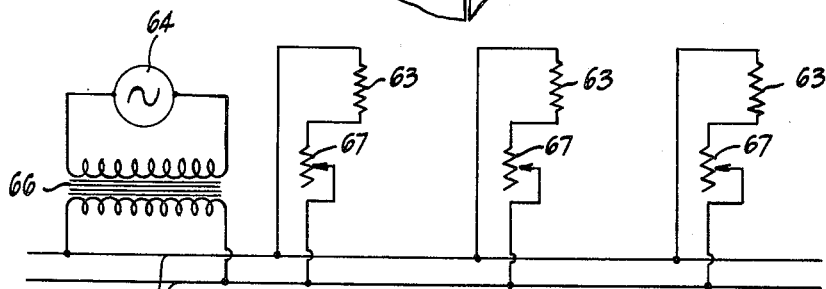
Figure 4 is a circuit diagram of a preferred form of electrical control embodied in the extrusion die of my invention.

Fine adjustment of the gap between working faces 47 and 48 of die blades 23 and 24 is accomplished by thermal expansion of the bolts 26 controlled by resistance heating wires 63 coiled about that portion 62 of each of the adjusting bolts 26 lying between adjusting nut 59 and the bottom of square notch 56. A schematic diagram of the electrical circuit for supplying power to and controlling the heat of each of the heating wires 63 is shown in Figure 4. A suitable source of A.C. power 64 supplies a common bus 65 through a power transformer 66. A number of series-connected heating wires 63 and variable resistors 67, one for each adjusting bolt 26 to be controlled, are connected in parallel across a common bus 65. It is apparent that this circuit provides means for independently controlling the power supplied to each of the heating wires 63 by operation of the appropriate resistor 67. The resistors 67 can be operated by means of manual controls provided with suitable indication means such as electrical meters or a stationary scale and pointer means associated with the movable part of each of the resistors. The resistors 67 also may be automatically controlled as by a conventional beta ray gauge arranged to continuously scan and measure the thickness of the plastic sheet being extruded. Those skilled in the art will appreciate that variable voltage transformers or other control devices may be employed in place of the resistors 67, if desired.

In operation, the die blades 23 and 24 are mounted on body portion 20 by means of the cap screws 49. The cap screws 49 are tightened so that the side faces 45 and 46 of the die blades and the body faces 31 and 32 are held together with sufficient pressure to prevent plastic material from leaking between the faces but not with so much pressure that the contact friction between the engaging faces cannot be overcome and the die blades moved with respect to body portion 20 by the mechanical and thermal adjustment of the effective length of the adjusting bolts 26 within the limits allowed by the oversize dimension of holes 50 in the two die blades. Preferably, a torque wrench is employed so that all of the screws can be tightened the same amount and to a setting that will just prevent leakage. The torque setting can be determined by observation of the die in service.

Before operating the extruder, the gap between the working faces 46 and 47 is set at approximately the desired dimension by individually mechanically adjusting each of the adjusting bolts 26 while the die is cold. If desired, the current can be caused to flow through the heating coils 63 with the resistors set, for example, in mid-position and the preliminary adjustment made with the bolts 26 at somewhat elevated temperatures. The extruder is then started, supplying the die with hot plastic material under pressure. As the hot plastic material passes through the die, some of its heat is given up to the die which eventually reaches a running temperature considerably above what its temperature was when the gap was first set. This change in temperature causes the various parts of the die to expand and alter the preset transverse dimension of the gap between the die blades 23 and 24. In a typical extrusion operation, the gap may be, for example, .019 to .020 inch. It is necessary that the narrow gap be accurately maintained throughout the width of the die in order to produce a high-grade and uniform product. Thus, a small amount of expansion of the die parts can adversely effect the uniformity and overall gauge of the sheet being extruded.

According to the present invention, variations in the gauge of the extruded sheet are easily and quickly corrected by the thermal readjustment of the adjusting bolts 26. As the sheet material is extruded from the die, departures from the desired gauge can be determined. The resistors 67, individually controlling the current in each of the heating wires 63 and thus the thermal expansion of each associated adjusting bolt 26, can be individually and variously adjusted in accordance with the departures from the predetermined gauge noted in the material extruded. If the bolts have been preheated, as described above, they can be cooled to cause them to contract or additionally heated to cause them to elongate by increasing or decreasing respectively, the effective resistance of the adjustable resistors 67.

It will be apparent that the control of the gap by means of the individually controllable heating wires 63 coiled about the bolts 26 provides a fine adjustment means for controlling the gap between the die blades 23 and 24 by changing the length of the portions 62 of bolts 26 between the projections 41 and 42 and the holes 55. Each bolt can be individually adjusted so that the thickness of the extruded sheet can be controlled accurately throughout the width of the sheet. The thermal fine adjustment means also provides an accurate and easy way for continuously adjusting the gauge of the sheet material being extruded from a position remote from the hot die. The electrical adjustment means, in addition to being more accurate and more easily operable than the coarse mechanical means usually provided, can be automatically controlled through the use of conventional apparatus in accordance with error signals output of a conventional beta ray gauge or other gauging means. The adjusting bolts not only have the ability to push the blades toward each other, but also can pull the blades away from each other if permitted to cool. The bolts exert powerful yet readily controllable forces on the blades and can exert sufficient force to bend the blades slightly to compensate for thermal distortion of the blades.

The V-shaped configuration of the preferred embodiment of my die is especially suited for extruding a thin plastic sheet for coating fabric or paper when used in conjunction with apparatus of the type partially shown in Figure 3. Such apparatus consists essentially of two rolls or drums mounted for rotation about parallel longitudinal axes so spaced so that the surfaces of the rolls have rolling engagement with each other. The fabric or paper to be coated is carried by the surface of one of the rolls 68, for example, and fed between the two rolls 68 and 69. To insure the proper bond of the plastic sheet coating to the paper or fabric, it is necessary to extrude the sheet material from a die gap located as close as possible to the line of contact of the two rolls 68 and 69. It is also necessary to cool quickly the hot sheet as it is pressed onto the fabric or paper. This is accomplished by providing the roll 69, for example, with a water surface film that bathes the outer face of the plastic film being coated. The V-shaped configuration of the cross section of the die illustrated in Figure 3 allows the die gap to be placed in close proximity to the point at which the extruded plastic sheet is pressed onto the paper or fabric to be coated.

Figure 5:
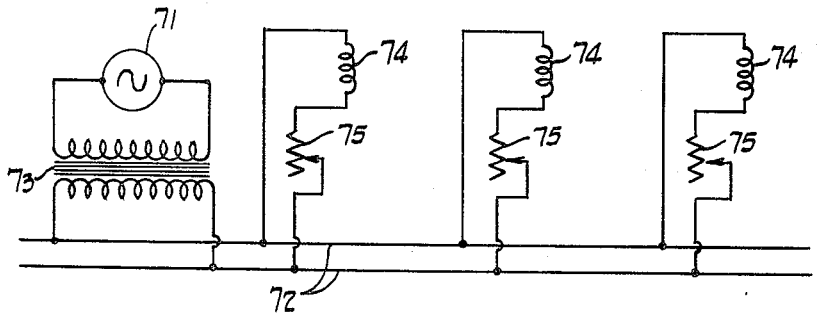
Figure 5 is a circuit diagram of a modified form of electrical control that may be embodied in the extrusion die of my invention.

The thermal heating of the adjusting bolts 26 may be accomplished by induction heating as well as conduction heating from resistance wires. A schematic circuit diagram for such a modified induction heating control system is shown in Figure 5.

A source of A.C. power 71 of suitable frequency is fed to common buses 72 through transformer 73. A number of circuits, each containing an induction heating coil 74 and an adjustable resistor 75 in series with each other, are connected in parallel across the buses 72. Each of the induction heating coils 74 is placed about the portion 62 of an adjusting bolt 26 between adjusting nut 59 and the associated die blade. The operation of this modified form of my invention is similar to that of the preferred embodiment, except that the temperature and thus the length of the bolts 26 is controlled by induction heating means rather than by the use of resistance wires and conductive heating, the portion 62 of the bolts being heated by eddy currents induced in them by the coils 74. Again, other control devices may be used in place of the resistors 75 if desired.

Those skilled in the art will appreciate that various other changes and modifications can be made in the preferred form of apparatus described herein without departing from the spirit and scope of the invention.

I claim:

1. A die for extruding plastic material into a sheet of controlled gauge comprising two die blades, at least one of which is movable relative to the other and each having a working face, a plurality of adjusting bolts associated with said movable die blade for adjusting the position of said blade with respect to the other, means for mechanical axial displacement of said bolts and heating means associated with each of said bolts for the thermal adjustment of the length of said bolts, said working faces of said die blades cooperating to form a die gap, said bolts being spaced apart along the length of said movable die blade whereby the transverse dimension of said die gap is adjustable throughout the length of said die gap by axial displacement of and thermal adjustment of the length of each of said adjusting bolts.

2. A die for extruding plastic material into a sheet of controlled gauge comprising two die blades movable relative to each other and each having a working face, a plurality of adjusting bolts associated with each of said die blades, means for mechanical axial displacement of said bolts and heating means associated with each of said bolts for the thermal adjustment of the length of said bolts, said working faces of said die blades cooperating to form a die gap, said bolts being spaced apart along the length of each of said die blades whereby the transverse dimension of said die gap is adjustable throughout the length of said die gap by axial displacement of and thermal adjustment of the length of each of said adjusting bolts.

3. A die for extruding plastic material into a sheet of controlled gauge comprising a body portion, and a die blade mounted on said body portion, and movable to control the width of the die gap, a plurality of adjusting bolts associated with said movable die blade and mounted on said body portion, means for mechanical axial displacement of said bolts relative to said body portion and heating means associated with each of said bolts for the thermal adjustment of the length of said bolts, said body portion containing an internal chamber having an inlet passage and an outlet passage, said bolts being spaced apart along the length of said movable die blade whereby the transverse dimension of said die gap is adjustable throughout the length of said die gap by axial displacement of and thermal adjustment of the length of each of said adjusting bolts.

4. A die for extruding plastic material into a sheet of controlled gauge comprising a body portion, a pair of die blades mounted on said body portion for limited movement relative to each other and each having a working face, a plurality of adjusting bolts associated with each of said die blades and mounted on said body portion, means for mechanical axial displacement of said bolts relative to said body portion and heating means associated with each of said bolts for the thermal adjustment of the length of said bolts, said body portion containing an internal chamber having an inlet passage and an outlet passage, said working faces of said die blades cooperating to form a die gap adjacent said outlet passage, said bolts being spaced apart along the length of each of said die blades whereby the transverse dimension of said die gap is adjustable throughout the length of said die gap by axial displacement of and thermal adjustment of the length of each of said adjusting bolts.

5. A die for extruding plastic material into a sheet of controlled gauge comprising a body portion, a pair of die blades mounted on said body portion for limited movement relative to each other and each having a working face, a plurality of bolts associated with each of said die blades and mounted on said body portion, means for mechanical axial adjustment of said bolts relative to said body portion and electrical induction heating means associated with each of said bolts for the thermal adjustment of the length of said bolts, said body portion containing an internal chamber having an inlet passage and an outlet passage, said working faces of said die blades cooperating to form a die gap adjacent said outlet passage, said bolts spaced apart along the length of each of said die blades whereby the transverse dimension of said die gap is adjustable throughout the length of said die gap by axial adjustment of and thermal adjustment of the length of each of said bolts.

6. A die for extruding plastic material into a sheet of controlled gauge comprising two die blades, at least one of which is movable relative to the other and each having a working face, a plurality of adjusting bolts associated with said movable die blades, heating means associated with each of said bolts for the thermal adjustment of the length of said bolts, said working faces of said die blades cooperating to form a die gap, said bolts spaced apart along the length of each of said movable die blades whereby the transverse dimension of said die gap is adjustable throughout the length of said die gap by thermal adjustment of the length of each of said bolts.

7. A die for extruding plastic material into a sheet of controlled gauge comprising a pair of die blades movable relative to each other and each having a working face, a plurality of adjusting bolts associated with each of said die blades, heating means associated with each of said bolts for the thermal adjustment of the length of said bolts, said working faces of said die blades cooperating to form a die gap, said bolts spaced apart along the length of each of said die blades whereby the transverse dimension of said die gap is adjustable throughout the length of said die gap by thermal adjustment of the length of each of said bolts.

8. A die for extruding plastic material into a sheet of controlled gauge comprising a body portion, two die blades mounted on said body portion, at least one of which is movable relative to the other and each having a working face, a plurality of adjusting bolts associated with said movable die blades and mounted on said body portion, heating means associated with each of said bolts for the thermal adjustment of the length of said bolts, said body portion containing an internal chamber having an inlet passage and an outlet passage, said working faces of said die blades cooperating to form a die gap adjacent said outlet passage, said bolts spaced apart along the length of each of said movable die blades whereby the transverse dimension of said die gap is adjustable throughout the length of said die gap by thermal adjustment of the length of each of said bolts.

9. A die for extruding plastic material into a sheet of controlled gauge comprising a body portion, a pair of die blades mounted on said body portion for limited movement relative to each other and each having a working face, a plurality of adjusting bolts associated with each of said die blades and mounted on said body portion, heating means associated with each of said bolts for the thermal adjustment of the length of said bolts, said body portion containing an internal chamber having an inlet passage and an outlet passage, said working faces of said die blades cooperating to form a die gap adjacent said outlet passage, said bolts spaced apart along the length of each of said die blades whereby the transverse dimension of said die gap is adjustable throughout the length of said die gap by thermal adjustment of the length of each of said bolts.

10. A die for extruding plastic material into a sheet of controlled gauge comprising a body portion, a pair of die blades mounted on said body portion for limited movement relative to each other and each having a working face, a plurality of bolts associated with each of said die blades and mounted on said body portion, individually adjustable electrical resistance heating means associated with each of said bolts for the thermal adjustment of the length of said bolts, said body portion containing an internal chamber having an inlet passage and an outlet passage, said working faces of said die blades cooperating to form a die gap adjacent said outlet passage, said bolts spaced apart along the length of each of said die blades whereby the transverse dimension of said die gap is adjustable throughout the length of said die gap by thermal adjustment of the length of each of said bolts.

11. A die for extruding plastic material into a sheet of controlled gauge comprising a body portion, a pair of die blades mounted on said body portion for limited movement relative to each other and each having a working face, a plurality of bolts associated with each of said die blades and mounted on said body portion, electrical induction heating means associated with each of said bolts for the thermal adjustment of the length of said bolts, said body portion containing an internal chamber having an inlet passage and an outlet passage, said working faces of said die blades cooperating to form a die gap adjacent said outlet passage, said bolts spaced apart along the length of each of said die blades whereby the transverse dimension of said die gap is adjustable throughout the length of said die gap by thermal adjustment of the length of each of said bolts.

12. A die for extruding plastic material in sheet form of controlled gauge comprising a longitudinal body portion containing a longitudinally extending interior chamber closed at each end and communicating with the exterior of said body portion through a transverse inlet passage entering said interior chamber approximately at its longitudinal midpoint and through a transverse slotted outlet longitudinally aligned and substantially co-extensive with said interior chamber, said interior chamber longitudinally distributing said plastic material introduced through said transverse inlet passage along said longitudinal outlet slot, a pair of longitudinally extending die blades mounted on said body portion along either side of said outlet slot for limited movement relative to said body portion and to each other, each of said die blades having a working face substantially parallel to and cooperating with the other to define an adjustable die gap longitudinally aligned with and adjacent to said outlet slot, a plurality of bolts spaced apart along the length of and acting laterally between each of said die blades and said body portion, heating means associated with each of said bolts for the thermal adjustment of the length of said bolts, each of said bolts being mechanically axially adjustable with respect to said body portion and thermally adjustable in length to position said working faces of said die blade with respect to each other, whereby said gap between working faces may be controlled throughout its length.

References Cited in the file of this patent

UNITED STATES PATENTS 2,387,718    Coleman  ---------------- Oct. 30, 1945